US012729826B2

(12) United States Patent
Muegge

(10) Patent No.: US 12,729,826 B2
(45) Date of Patent: Sep. 8, 2026

(54) LIGHTING DEVICE FOR A MOTOR VEHICLE

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/755,574

(22) Filed: Jun. 26, 2024

(65) Prior Publication Data

US 2024/0426455 A1 Dec. 26, 2024

(30) Foreign Application Priority Data

Jun. 26, 2023 (DE) ..................... 10 2023 116 680.8

(51) Int. Cl.
*F21S 43/20* (2018.01)
*F21S 43/14* (2018.01)
*F21S 43/239* (2018.01)
*F21S 43/31* (2018.01)

(52) U.S. Cl.
CPC ........... *F21S 43/2815* (2024.05); *F21S 43/14* (2018.01); *F21S 43/239* (2018.01); *F21S 43/2817* (2024.05); *F21S 43/31* (2018.01); *F21S 2243/00* (2024.05)

(58) Field of Classification Search
CPC ...... F21S 43/2815; F21S 43/14; F21S 43/239; F21S 43/31; F21S 43/2817
See application file for complete search history.

(56) References Cited

U.S. PATENT DOCUMENTS

| | | | | |
|---|---|---|---|---|
| 8,979,343 | B2 * | 3/2015 | Ha | F21V 7/09 362/613 |
| 10,023,100 | B2 * | 7/2018 | Salter | F21S 43/14 |
| 10,309,610 | B2 * | 6/2019 | Glickman | F21S 43/26 |
| 11,255,509 | B2 * | 2/2022 | Kleijnen | F21V 7/0033 |
| 11,339,941 | B2 * | 5/2022 | Liu | F21S 43/239 |
| 11,867,370 | B2 * | 1/2024 | Kessels | B60Q 1/2607 |
| 12,216,305 | B2 * | 2/2025 | Tong | G06F 3/0412 |
| 12,302,671 | B2 * | 5/2025 | Chae | H10H 20/853 |

(Continued)

FOREIGN PATENT DOCUMENTS

| | | |
|---|---|---|
| DE | 102019123657 A1 | 3/2021 |
| DE | 102021122264 A1 | 3/2023 |

*Primary Examiner* — Matthew J. Peerce
(74) *Attorney, Agent, or Firm* — Muncy, Geissler, Olds & Lowe, P.C.

(57) ABSTRACT

A lighting device for a motor vehicle, has at least one light source, a flat light guide with an entry surface and at least one exit surface. At least one optical component is designed as an optical panel or optical film. The lighting device being configured so that the light generated by the at least one light source enters, at least in part, through the entry surface and into the light guide. The light entering through the entry surface exits, at least in part, from the at least one exit surface, and the light exiting the at least one exit surface of the light guide passes, at least in part, through the at least one optical component and/or is reflected by the at least one optical component. The flat light guide and/or the at least one optical component is made, at least in part, of silicone.

3 Claims, 4 Drawing Sheets

(56) References Cited

U.S. PATENT DOCUMENTS

| | | | | |
|---|---|---|---|---|
| 2006/0044825 | A1 * | 3/2006 | Sa | F21S 41/24 362/600 |
| 2011/0013411 | A1 | 1/2011 | Sakiyama et al. | |
| 2024/0093860 | A1 * | 3/2024 | Baker | F21S 43/28135 |
| 2024/0280238 | A1 | 8/2024 | Duhme et al. | |

* cited by examiner

LIGHTING DEVICE FOR A MOTOR VEHICLE

This nonprovisional application claims priority under 35 U.S.C. § 119 (a) to German Patent Application No. 10 2023 116 680.8, which was filed in Germany on Jun. 26, 2023, and which is herein incorporated by reference.

BACKGROUND OF THE INVENTION

Field of the Invention

The present invention relates to a lighting device for a motor vehicle and to a method for manufacturing this type of lighting device.

Description of the Background Art

For the signal functions of a motor vehicle, for example a taillight, a brake light, a turn signal light, or a daytime running light, in rear lights or headlights, the design has been a determining factor for quite some time. The design of these lighting devices has become even more important since the introduction of LED technology, since the small light-emitting diodes, which are often used in large numbers, are much more flexible in use than a large light bulb as an illuminant of a signal function, so that a wide variety of design options is available in conjunction with the selected optical system.

One modification of LED technology is found in the form of OLED technology, in which the illuminant is not in the form of a small point as with a light-emitting diode, but instead has a larger, planar design in order to form a desired illuminated area that can be illuminated in a very homogeneous manner. One disadvantage of the OLED technology is its much higher cost compared to LED technology. This high cost is due to a complex manufacturing process, the different shapes as specified by the design, and small production volumes. In addition, there are specialized, stringent requirements in the automotive field, such as resistance to UV exposure and force effects such as vibrations, impacts, and shaking, as well as temperature resistance in a range between −40° C. and +85° C. or +100° C. These requirements are much more difficult to meet for an organic light-emitting diode than for standard light-emitting diodes.

As a result, alternative options are being sought to achieve a design that is similar to organic light-emitting diodes (OLEDs), in particular a homogeneously illuminated surface. This is achieved by using light-emitting diodes (LEDs) having a flat light guide and upstream optics, in the form of microstructured films or thin optical panels, for scattering the light that is emitted from the light guide. Overall, a flat light module is provided which offers high performance with homogeneous illumination of the entire surface.

The same as for organic light-emitting diodes, when integrated into a taillight, multiple flat light modules may be positioned with an offset next to and behind one another in order to create the desired individual appearance of the signal function of the taillight or the brake light, for example.

An example of a flat light module is made up of a front and a rear housing part that are connected to one another by latching. Alternatively, the front housing part may be designed as a two-part component with a transparent panel. A plate-shaped light guide with micro-optics, a white, diffusely reflective film behind the light guide, and two or three micro-optical films in front of the light guide are introduced between the housing parts, and as a whole are responsible for the light distribution and efficiency of the system, in that the individual micro-optical components are coordinated with one another. Typical light guides and/or optical components in known flat light modules are generally made of PMMA or PC.

A lighting device of the type mentioned at the outset is known from DE 10 2021 122 264 A1, which is incorporated herein by reference. The lighting device described therein comprises a lighting module that is designed as a flat light module and that includes the at least one light source, a light guide, a diffusion panel, and an illuminated area, designed as an outer panel, from which light exits during operation of the lighting device. The flat light module also has a housing with a reflective surface.

Present examples of flat light modules are planar and have a relatively small design. An arrangement of multiple adjacently situated planar flat light modules in first automotive series applications is certainly possible. However, for further automotive applications it would be desirable to be able to have curved and/or fairly large flat light modules which have, for example, an elongated, rectangular shape and which in particular are also curved.

SUMMARY OF THE INVENTION

It is therefore an object of the present invention to provide a lighting device that may have a curved design. Furthermore, a method is provided via which this type of lighting device may be efficiently and/or cost-effectively manufactured.

In an example, the flat light guide and/or the at least one optical component can be made of silicone, or that the flat light guide and/or the at least one optical component contain(s) silicone. The fabrication of the light guide and/or the at least one optical component from silicone allows the manufacture of curved lighting devices. The design of the light guide and/or of the at least one optical component made of silicone may result in further advantages, in particular regarding more efficient or cost-effective manufacture of the lighting device.

The flat light guide and/or the at least one optical component can be bendable. In particular, the flat light guide and/or the at least one optical component in the assembled state of the lighting device may have at least one bend.

It may be provided that the bending radius of the flat light guide is greater than three times the thickness of the light guide, in particular greater than four times the thickness of the light guide. For radii of this magnitude, the situation is avoided that undesirable outcoupling of the light from the light guide occurs, which would result in disturbance of the homogeneity of the illuminated exit surface of the lighting device. For example, the bending radius of the flat light guide may have a value between three times and twelve times the thickness of the light guide.

It may be provided that the bending radius of the flat light guide is greater than 8 mm, in particular greater than 12 mm. This ensures that for wall thicknesses or thicknesses between 2 mm and 3 mm, which are typically provided for flat light modules, no undesirable outcoupling of the light from the light guide occurs. For example, the bending radius of the flat light guide may have a value between 8 mm and 25 mm.

There is an option for the light guide to have structuring, the light guide being configured to deflect from the structuring, at least in part, the light that is propagating through the light guide, in such a way that the light exits the light guide through the at least one exit surface.

It may be provided that the at least one optical component can have structuring, the optical component being configured so that the light exiting the light guide passes through the optical component. The structurings may contribute to the diffusion and homogenization of the light exiting the lighting device.

There is an option for the at least one optical component to have a reflective design, the optical component being configured so that the light exiting the light guide is reflected by the optical component. In particular, the reflectively designed optical component may have a white surface that diffusely reflects the light.

It may be provided that the light guide can have a first exit surface and a second exit surface situated opposite one another. As a result, the light can exit from the light guide not only at the front in the direction of the at least one optical component that is provided with the structuring, but also at the rear in the direction of the reflectively designed optical component.

The lighting device may be configured so that light exiting the second exit surface of the light guide strikes the reflectively designed optical component, is reflected by same back to the second exit surface, and through the second exit surface at least partially re-enters the light guide before it exits from the first exit surface, the light in particular passing through another of the optical components.

There is an option for the at least one optical component, in particular the reflectively designed optical component, can be connected to the light guide, in particular connected thereto at one of the end-face sides of the light guide. This results in simpler manufacture of the lighting device, since on the one hand the light guide and the optical component may be manufactured together, and on the other hand the positioning of the two parts relative to one another during the assembly of the lighting device is simpler due to the connection.

The method is characterized in that a light guide and/or at least one optical component that is designed as an optical panel or optical film are/is manufactured using an injection molding process. The light guide and the at least one optical component can be introduced into the housing of the lighting device.

An injection molding process for manufacturing the light guide and/or the at least one optical component may be used for the mass production of corresponding lighting devices.

It may be provided that the structuring of the light guide and/or of the at least one optical component is produced during the injection molding process, in particular appropriate structuring of the injection mold taking place via a lithographic process or via laser machining.

The light guide and/or the at least one optical component can be bent during the assembly of the lighting device. As a result, the light guide and/or the at least one optical component may be manufactured as planar implementations, which simplifies the injection molding process. In particular when the structurings of the light guide and/or of the optical component are produced during the injection molding, the introduction of corresponding microstructure elements into the mold area of the injection mold is much easier with a planar injection-molded part. This is due to the fact that, for example, limitations regarding the demolding direction do not have to be taken into account, so that microstructure elements may be uniformly introduced into the mold area of the injection mold.

It may be provided that the light guide and the optical component, in particular the reflectively designed optical component, can be manufactured as a one-piece injection-molded part in which the light guide and the optical component adjoin one another in the longitudinal or transverse direction, and during the introduction into the housing the optical component is folded over so that it rests on the at least one exit surface of the light guide. Due to the fabrication of the light guide and the optical component as a one-piece injection-molded part, manufacturing these two parts is more favorable. In addition, the installation of the lighting device is simplified, since folding over the optical component onto the at least one exit surface of the light guide makes it easier to position the two parts relative to one another during assembly of the lighting device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
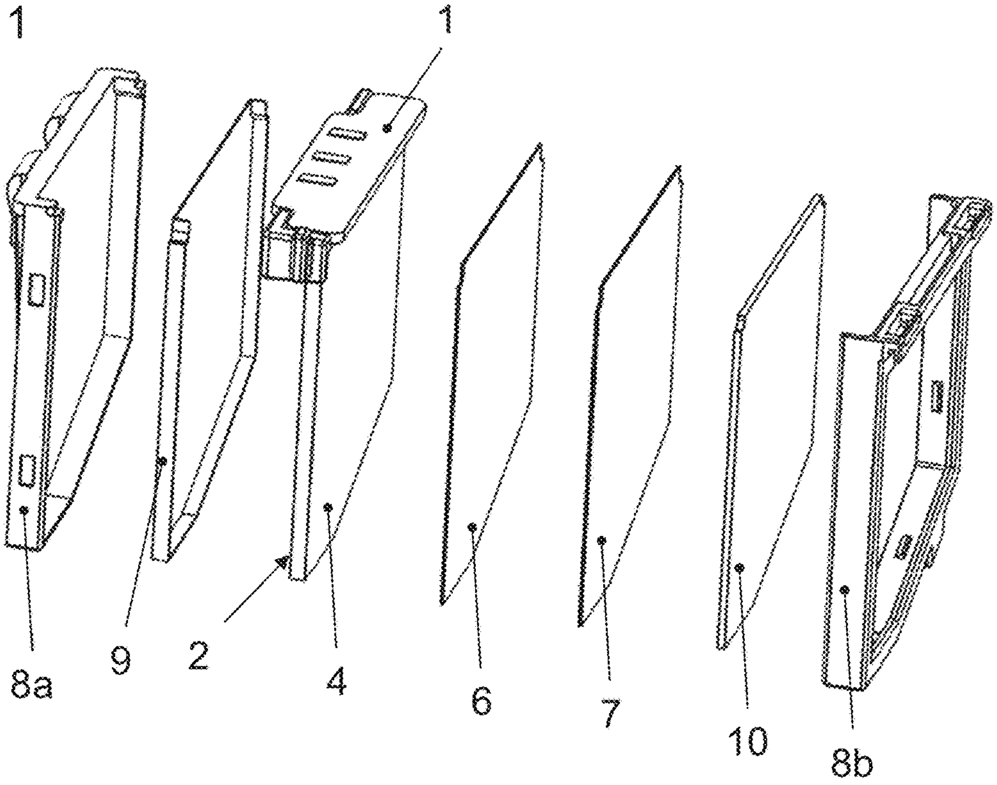
FIG. 1 shows an exploded view of an example of a lighting device according to the invention.

The lighting device depicted in the figures comprises a light source that is designed as a light-emitting diode (LED), or multiple light sources that are designed as light-emitting diodes (LEDs). FIG. 1 illustrates a circuit board 1 on which the light sources designed as light-emitting diodes are situated. The multiple light-emitting diodes may also have different colors, for example in order to implement a twofold function or a threefold function. These functions may be, for example, a navigation light, a daytime running light, and a travel direction indicator, or a navigation light, a daytime running light, and an autonomous driving function, wherein the autonomous driving function requires a cyan color.

Figure 3:
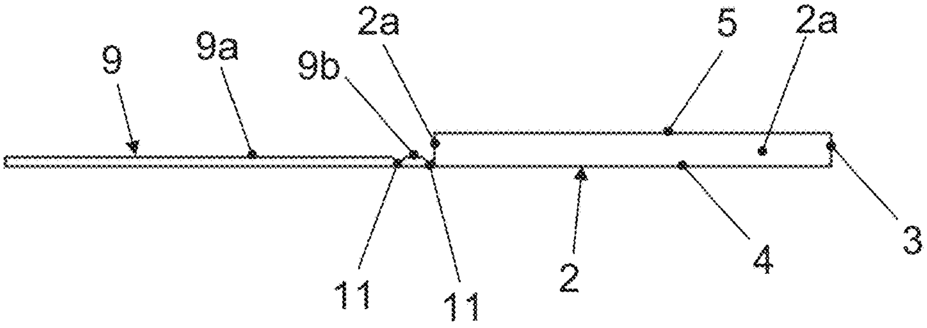
FIG. 3 shows a side view of the light guide and the optical component of the lighting device according to FIG. 2.
Figure 7:
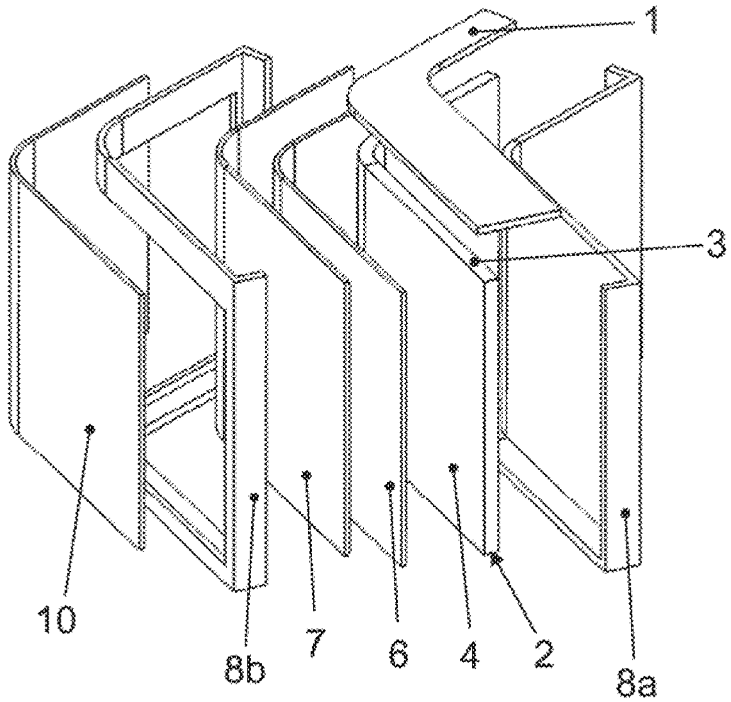
FIG. 7 shows an exploded view of the lighting device according to FIG. 6.

The lighting device further comprises a flat light guide 2 having an entry surface 3 and a first and a second exit surface 4, 5 (see FIGS. 1, 3, and 7). The entry surface 3 is designed as an end face-side surface of the light guide 2, whereas the exit surfaces 4, 5 are designed as a front side and a rear side of the light guide 2.

The lighting device further comprises a first optical component 6, designed as an optical panel, situated in front of the first exit surface 4 of the light guide 2, and a second optical component 7, designed as an optical panel, situated in front of the first optical component 6 (see FIGS. 1 and 7). The second optical component 7 is optional and may also be omitted. Alternatively, the optical components 6, 7 may be designed as optical films. The at least one optical component 6, 7 may have structuring, which may contribute to the diffusion and homogenization of the light emitted from the lighting device.

Figure 6:
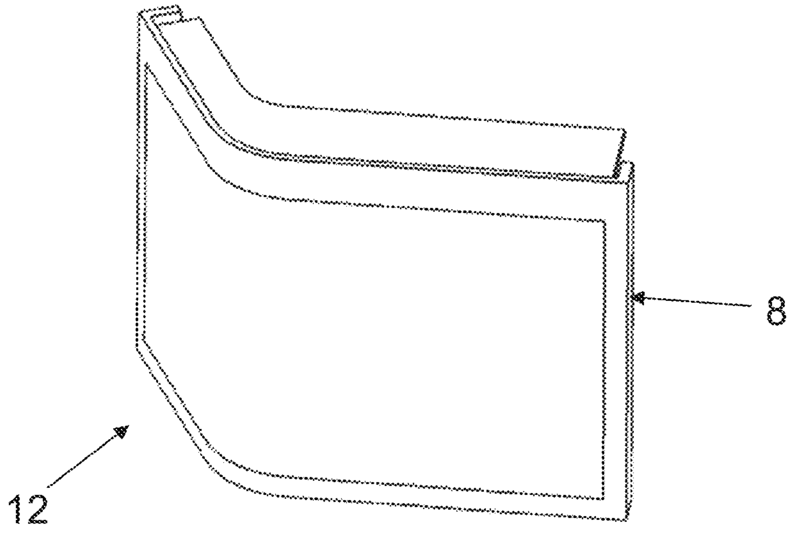
FIG. 6 shows a detail from FIG. 5 showing the example of a lighting device according to the invention.

The lighting device further comprises a housing 8 in which the at least one light source 1, the light guide 2, and the optical components 6, 7 may be at least partially accommodated (see FIGS. 1, 6, and 7). The housing 8 may have a two-part design for simplified installation of the optical components, and may have a rear and a front housing part 8*a*, 8*b* (see FIGS. 1 and 7). The light guide 2 and the optical components 6, 7 may then be positioned between these housing parts 8*a*, 8*b*, and may be held and fixed when the two housing parts 8*a*, 8*b* are joined together. The housing parts 8*a*, 8*b* may be latched together, or screwed or welded from the rear side.

The rear housing part 8*a* may have a rear wall having a reflective design, at least in part (see FIG. 7). Alternatively, a reflectively designed optical component 9 may be provided (see FIG. 1) which, for example, is a reflective optical film having a white surface in order to diffusely reflect the light. The reflectively designed optical component 9 is bent at the edges. The second exit surface 5 of the light guide 2 and also the lateral edges of the light guide 2 are thus covered in order to ideally reflect exiting light back into the light guide 2.

The lighting device further comprises an optical component 10, designed as an outer panel, that is illuminated as homogeneously as possible by the light exiting the light guide 2 (see FIGS. 1 and 7). The outer panel may be used as an illuminated exit surface of the lighting device. There is an option for the optical component 10, designed as an outer panel, to be provided as a two-component part in a one-piece design with the front housing part 8*b*.

During operation of the lighting device, light emitted from the light sources is coupled in to the end face-side entry surface 3 of the light guide 2. A portion of the coupled-in light directly exits the first exit surface 4, at the right in FIG. 1, and leaves the lighting device after passing through the optical components 6, 7 and the outer panel. In addition, a portion of the light propagating in the light guide 2 exits the second exit surface 5 of the light guide 2 and strikes the reflectively designed optical component 9. The light is reflected from the optical component 9 back to the second exit surface 5, so that, at least in part, it enters through the second exit surface 5 and back into the light guide 2 before it exits the first exit surface 4 and leaves the lighting device through the optical components 6, 7 and the outer panel.

The light guide 2 and/or the optical components 6, 7, 9, 10 may be made of or may include silicone. The light guide 2 and/or the optical components 6, 7, 9, 10 may in particular be manufactured using an injection molding process. Due to the design of the light guide 2 and/or the optical components 6, 7, 9, 10 as silicone components, the lighting device may have a bent design (see FIG. 7). In addition, the manufacture may be simplified due to the fact that the manufacture of various parts may be combined.

Figure 2:
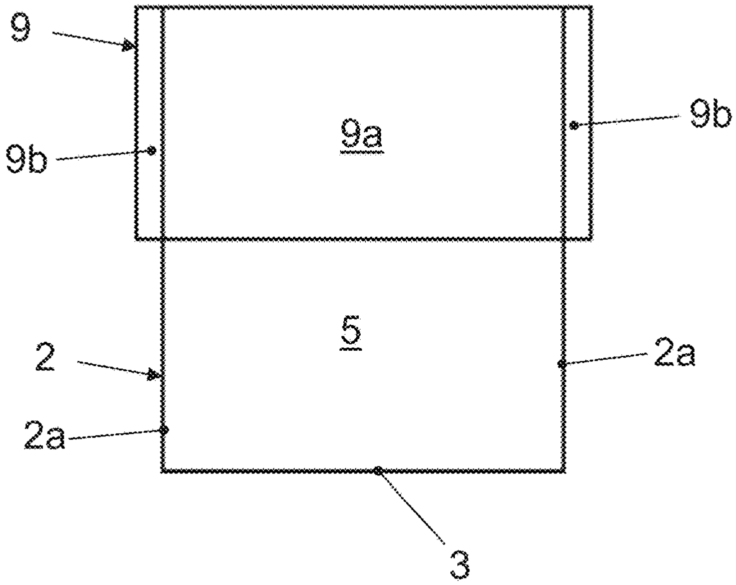
FIG. 2 shows a top view of a light guide and an optical component, connected thereto, of an example of a lighting device according to the invention.
Figure 4:
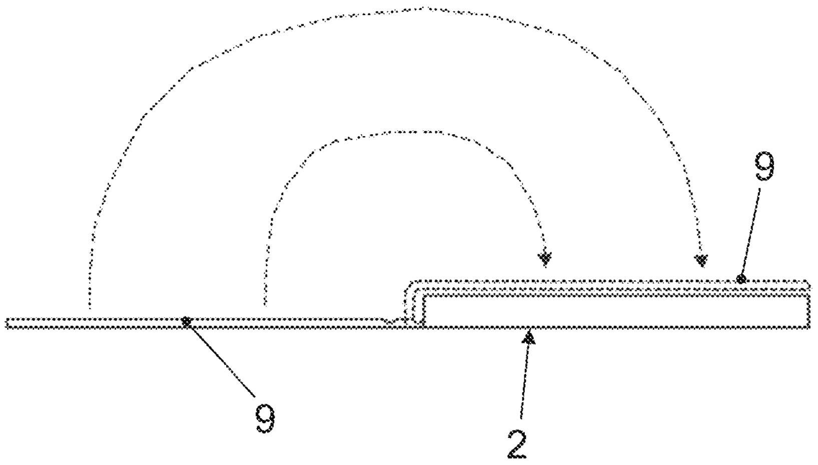
FIG. 4 shows a view of the light guide corresponding to FIG. 3 and of the optical component of the lighting device according to FIG. 2, the folded-together state of the parts being indicated in this view.

FIGS. 2 through 4 show an example in which the light guide 2 and the reflectively designed optical component 9 are manufactured as a one-piece injection-molded part. In the unmounted state, the optical component 9 adjoins the light guide 2 (see FIG. 3). The optical component 9 has a first section 9*a*, which in the mounted state covers the second exit surface 5 of the light guide 2. The optical component 9 also has three second sections 9*b*, which in the mounted state rest against the side faces 2*a* of the light guide 2 not used as an entry surface 3, and cover them.

The connection region between the light guide 2 and the optical component 9 has two bent edges 11 that simplify folding over the optical component 9 onto the light guide 2. FIG. 4 shows in dashed lines the optical component 9 folded onto the light guide 2. In the folded state, the optical component 9 rests against the second exit surface 5 and the side faces 2*a* of the light guide 2 not used as an entry surface 3, and effectively covers them.

The lighting device may be used as a single light module for a signal function, or as part of an arrangement of multiple light modules for a signal function. Multiple such light modules placed side by side, also with partial overlapping, may together form a signal function. This may be, for example, a daytime running light or a travel direction indicator or also a combination of both functions, in particular when the light sources have a first light-emitting diode with the color "white" and a second light-emitting diode with the color "yellow."

Figure 5:
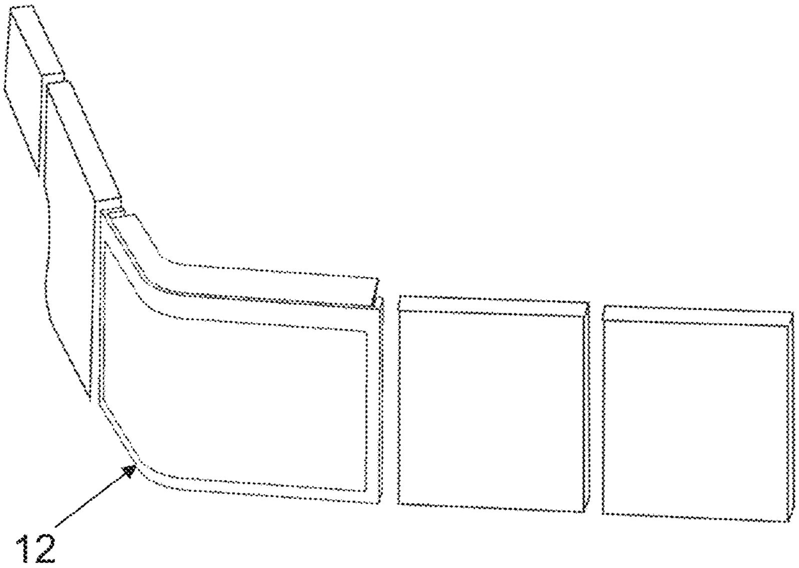
FIG. 5 shows a perspective view of a plurality of adjacently situated light modules with an example of a lighting device according to the invention.

FIG. 5 shows a corresponding example with an arrangement of multiple light modules, of which the third example of a lighting device according to the invention is the middle light module 12 which is used as a bent corner element. A signal function that is designed with multiple flat light modules, as an illuminating area, may be guided around the corner of a lighting device designed as a taillight, for example, and the illuminating area may continue in the side region of the taillight. Due to the design of the light guide 2 and/or of the optical components 6, 7, 9, 10 as silicone components, the light module 12 used as a corner element and illustrated in FIG. 6 and in the exploded view in FIG. 7 may also be provided with a comparatively homogeneously illuminating outer panel.

Figure 8:
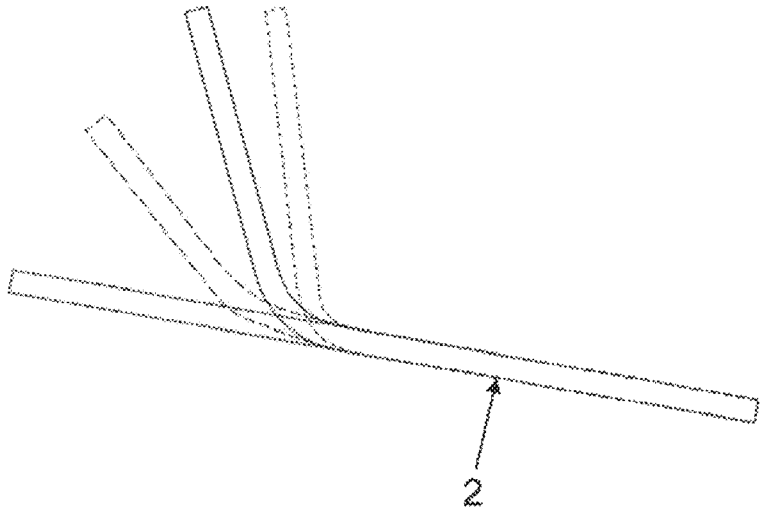
FIG. 8 shows a schematic illustration of the bending of the light guide of the lighting device according to FIG. 6.
Figure 9:
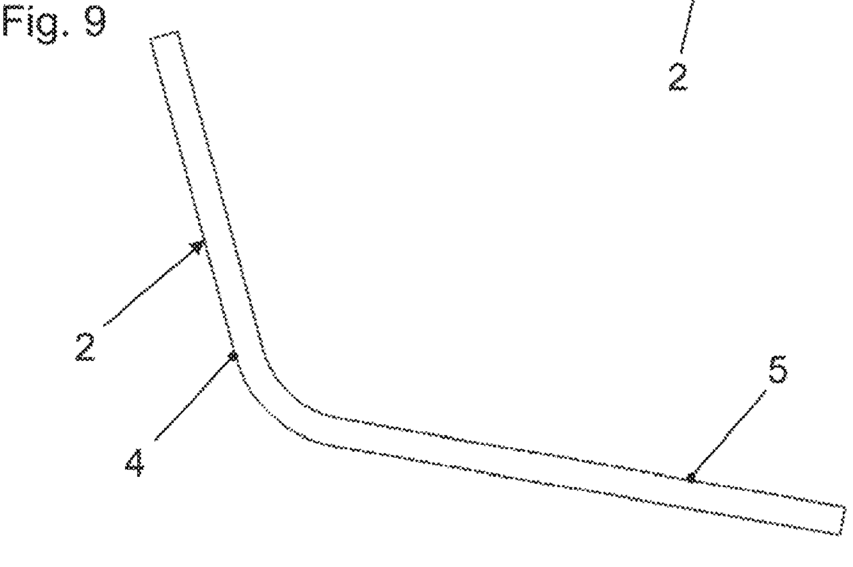
FIG. 9 shows a side view of the light guide of the lighting device according to FIG. 6 in the bent state.
Figure 10:
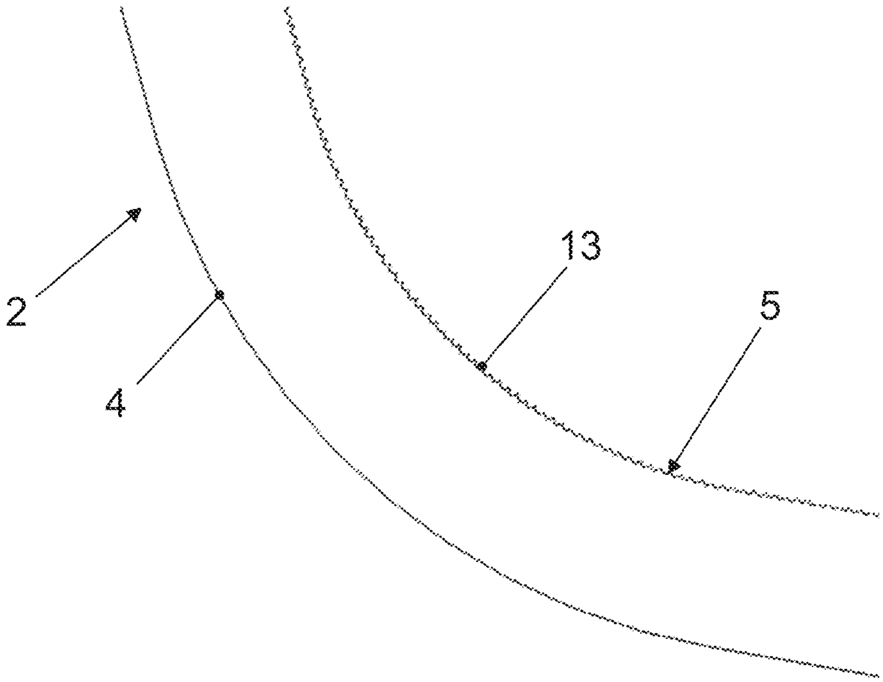
FIG. 10 shows a detail from FIG. 9.

The light guide 2 and/or the optical components 6, 7, 9, 10 as a planar implementation may be manufactured as injection-molded parts, and brought into the bent shape only when the lighting device and the light module 12 are put together, as indicated in FIG. 8 for various bending radii.

Large bending radii are not critical, whereas for excessively small bending radii there is a risk that undesirable outcoupling of the light from the light guide 2 may occur, which would result in disturbance of the homogeneity of the illuminated outer panel 10 of the lighting device. It may be provided that the bending radius of the light guide 2 is greater than three times the thickness of the light guide 2, preferably greater than four times the thickness of the light guide 2. Undesirable outcoupling of the light from the light guide is avoided with radii of this magnitude.

For example, it may be provided that the bending radius of the light guide 2 is greater than 8 mm, preferably greater than 12 mm. This ensures that for wall thicknesses or thicknesses of the light guide 2 between 2 mm and 3 mm, which are typically provided for flat light modules, no undesirable outcoupling of the light from the light guide 2 occurs. It is certainly possible to use larger radii, for example radii between 15 mm and 25 mm, in order to create an attractive geometric course in the corner region, and so that an excessively sharp or pointed corner is not provided.

The optical components 6, 7, 9, 10 and the housing parts 8*a*, 8*b* may have the same curvature or the same bend as the light guide 2 (see FIG. 7).

On its second exit surface 5, the light guide 2 bears structuring 13 that is used as outcoupling optics. Alternatively or additionally, it may be provided that structuring, is also provided on the first exit surface 4. For the homogeneous illumination that is to be produced in flat light modules, it is meaningful for the optics to be designed as micro-optics with sizes smaller than 200 μm, in particular smaller than 100 μm. The structuring 13 may be designed in the light guide 2 either as a recessed optical structure, or as a concave, elevated, or convex structure.

Figure 11:
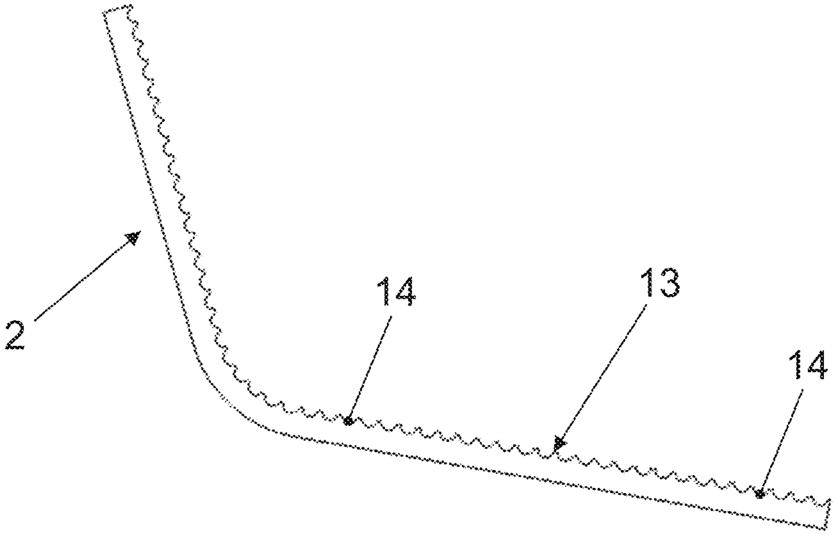
FIG. 11 shows a side view of the light guide of the lighting device according to FIG. 6 in the bent state, the structuring being shown in an oversized illustration for explanation.

As an example, FIG. 11 shows structuring 13 designed as a recessed optical structure with small planar surfaces 14 between the individual optics. The distribution of the optics over the exit surface 5 of the light guide 2 varies, and is suitably selected in order to achieve the desired homogeneous illumination of the optical component 10 used as an outer panel.

It may be provided that the structuring of the light guide 2 and/or of the at least one optical component 6, 7 is produced during the injection molding process. Appropriate structuring of the injection mold may take place via a lithographic process or via laser machining.

For a lithographic process, for example UV lithography or laser interference lithography, a planar master optic is produced, from which a thin nickel shim is then galvanically molded. The nickel shim is either inserted directly into a mold, or after it is molded it is galvanically further built up to form a thicker mold insert.

Also, direct laser machining of the mold offers advantages with regard to time and costs for producing the structuring. Furthermore, in the event of possible repairs, the mold may be re-lasered, while for the lithographic method a completely new nickel shim or thicker electroplating must be produced. The laser machining of the mold is therefore the preferred method.

By use of laser machining of the mold, for micro-optics having an elevated or convex design, and also micro-optics having a recessed or concave design, on the mold side suitable structurings may be produced on the at least one exit surface 4, 5 of the light guide 2.

A corresponding design or adaptation may likewise be provided for the structurings of the optical components 6, 7, which may be designed as micro-optics or diffuser optics.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing a lighting device that comprises at least one light source; a flat light guide with an entry surface and at least one exit surface, the entry surface being an end face-side surface of the flat light guide; at least one optical component that is designed as an optical panel or optical film, the lighting device being configured so that the light generated by the at least one light source enters, at least in part, through the entry surface and into the flat light guide, the light entering through the entry surface exits, at least in part, from the at least one exit surface, and the light exiting the at least one exit surface of the flat light guide passes, at least in part, through the at least one optical component or is reflected by the at least one optical component; and a housing at or in which the flat light guide and the at least one optical component are arranged, the flat light guide and the at least one optical component being made of silicone or the flat light guide and the at least one optical component including silicone, the method comprising:

using an injection molding process to manufacture the flat light guide and the at least one optical component, so that the flat light guide and the at least one optical component are made of silicone or include silicone;

introducing the flat light guide and the at least one optical component into the housing of the lighting device, wherein the at least one optical component has a reflective design, and wherein the flat light guide and the at least one optical component are manufactured as a one-piece injection-molded part in which the flat light guide and the at least one optical component adjoin one another in the longitudinal or transverse direction, and wherein during introduction of the at least one optical component and the flat light guide into the housing, the at least one optical component is folded over the flat light guide so that the at least one optical component rests on the at least one exit surface of the flat light guide.

2. The method according to claim 1, wherein a structuring to diffuse light is formed on at least one of the flat light guide or the at least one optical component by an injection mold during the injection molding process, the structuring being provided on the injection mold via a lithographic process or via laser machining.

3. The method according to claim 1, wherein the flat light guide and the at least one optical component are bent when introducing the flat light guide and the at least one optical component into the housing of the lighting device.

* * * * *